Oct. 20, 1936.    W. F. MESINGER    2,058,385
CONSTANT PRESSURE APPARATUS
Filed Dec. 30, 1932    2 Sheets-Sheet 1
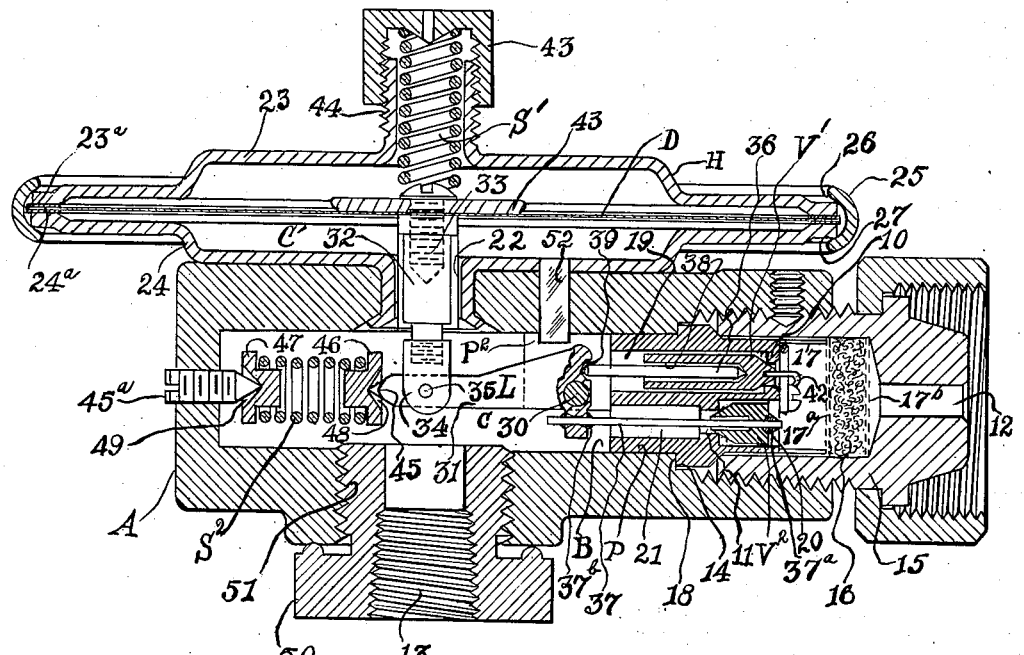
FIG.1
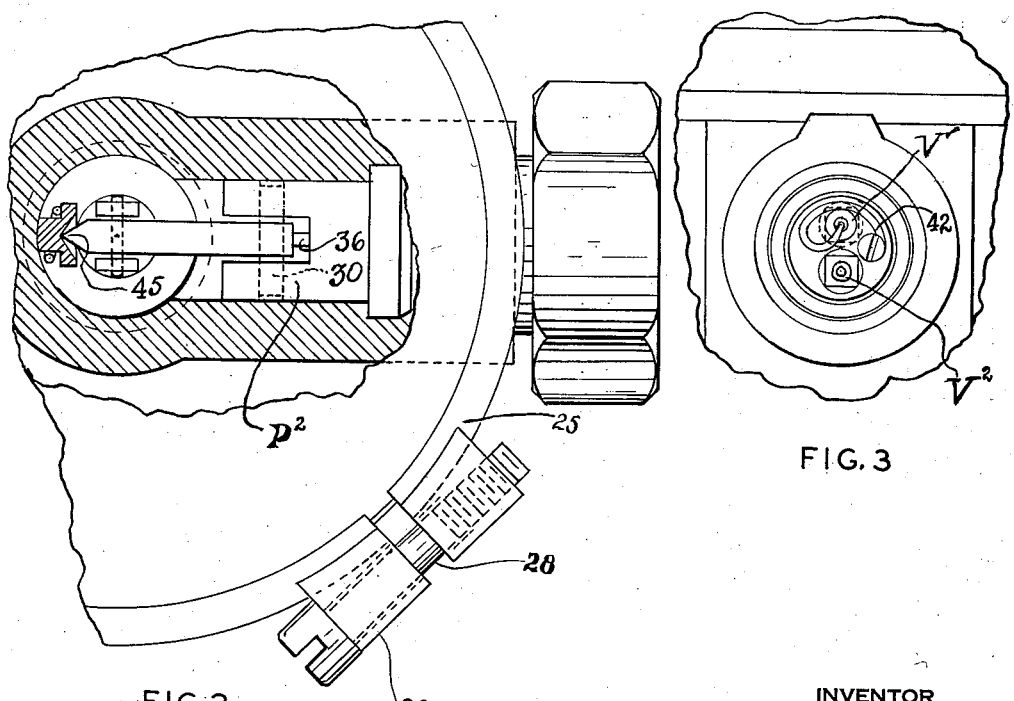
FIG.2
FIG.3
INVENTOR
WILLIAM F. MESINGER
BY
ATTORNEY Oct. 20, 1936.  W. F. MESINGER  2,058,385
CONSTANT PRESSURE APPARATUS
Filed Dec. 30, 1932  2 Sheets-Sheet 2

INVENTOR
WILLIAM F. MESINGER
BY
ATTORNEY

Patented Oct. 20, 1936

2,058,385

UNITED STATES PATENT OFFICE 2,058,385

CONSTANT PRESSURE APPARATUS

William F. Mesinger, Flushing, N. Y., assignor, by mesne assignments, to Union Carbide and Carbon Corporation, a corporation of New York Application December 30, 1932, Serial No. 649,487

15 Claims. (Cl. 50—26)

This invention relates to apparatus for counteracting changes in spring pressure due to deflection of a spring from a given normal in order to maintain the resultant spring pressure substantially constant throughout a given range of deflection and more particularly to the application of such apparatus to the operation of fluid pressure regulators.

Situations arise with various types of mechanical apparatus where it is desirable to make provision for the continuous exertion of a force upon a member the position of which is varied at times and to maintain the force constant regardless of the change in position of the member from a predetermined normal. Typical of such apparatus is the fluid pressure regulator commonly used between a source of fluid fuel supply and distribution conduits leading to points of fuel consumption. Pressure regulators of this character as heretofore known ordinarily comprise a casing having a fluid passage therethrough, flow of fluid through which is under control of a valve operated automatically by pressure responsive means, as a flexible diaphragm, under influence of pressure changes within the passage on the outlet side of the valve and so constructed and arranged as to control the discharge pressure of the regulator apparatus. Responsiveness of the diaphragm to pressure changes is customarily adjusted under control of regulator means, as a helical spring, resting on the diaphragm the compression of which is adjustable by suitable means connected therewith.

With only slight movements of the diaphragm from its normal position, the discharge pressure of fluid flowing through the regulator is maintained sufficiently uniform for most purposes. On the other hand, when the diaphragm moves between comparatively wide limits, the increase in force exerted by the helical spring on the diaphragm due to compression of the spring varies materially from the normal as the position of the diaphragm departs further and further from its central position, thereby objectionably varying the discharge pressure of the fluid from that for which the mechanism has been set. Typical of such situations is the interchangeable use of blowpipes of varying fuel consuming capacity in connection with the regulator apparatus where it is desired that the pressure at which the fuel is delivered shall be the same regardless of the capacity of the blowpipe used. With this arrangement, when a blowpipe of greater capacity is substituted for one of less, the volume of gas consumed will be greater and in consequence, the valve will be opened wider to admit the required volume, the diaphragm will be raised compressing the regulator spring and fuel will be delivered at a proportionally increased pressure which is objectionable in situations of this kind. Were a blowpipe of less capacity substituted of course the reverse of the above would result with equally objectionable effect.

The delivery pressure of fluid is also objectionably varied from the desired uniform normal by changes in the head pressure on the inlet side of the valve when that pressure varies materially from that for which the regulator mechanism has been adjusted. Variations in head pressure above the normal tend to resist opening of the valve or hasten the closing thereof as the case may be under influence of changes in pressure in the passage on the outlet side of the valve and variations below normal tend to render the valve too responsive to the opening influences in the outlet portion of the passage while not rendering the normal assistance to closing movements thereof.

It is an important object of this invention, therefore, in pressure regulators of the above character and in other mechanisms where exertion of a uniform force on a movable member by spring means is desired, to provide an improved mechanical organization whereby the resultant force on the movable member may be maintained substantially uniform regardless of variations of the position of the member from its normal position.

A further object of the invention is to provide in a pressure regulator an improved organization of mechanical parts whereby the discharge pressure thereof will be maintained uniform regardless of the position of the pressure responsive means, of the variations in the rate of discharge, and of variations in head pressure in the system on the inlet side of the valve means.

A further object of the invention is to provide an improved organization of parts in a pressure regulator whereby the assembly and dismantling thereof may be facilitated and in which control of and compensation for the several variable influences tending to oppose uniformity in discharge pressure may be obtained with a minimum number of mechanical units.

In accordance with this invention, as applied to fluid pressure regulators, there may be provided compensating means for balancing the force of the regulator means upon the pressure-responsive means, so constructed and so related to the regulator means as to counteract variations in force exerted by the regulator means upon the pressure-responsive means due to movements of the latter to and from the normal position to which it has been adjusted. Such compensating means may comprise mechanism having toggle joint action and including a resilient factor operating in opposition to the regulator means compensatorily to variations in force from a desired normal exerted by the regulator means on the pressure-responsive means.

In a pressure regulator of this character, also, the effect of changes in head pressure upon the operation of the valve means for controlling the flow of fluid through the passage and upon the delivery pressure of the apparatus may be eliminated by providing, in place of the customary single control valve, a pair of oppositely operating valve in control of separate ports; the valves being under control of pressure within the casing through the pressure-responsive means and a lever connected between said means and the valves so pivoted in the casing and so connected to the valves that they will be operated thereby simultaneously and so that the moments of force of head pressure on the valves about the pivot point of the lever will counterbalance each other. With this organization, also, the lever and valves may be carried by a valve block and may be assembled therewith prior to assembly with the casing.

The above and other objects and the novel features of the invention will be made apparent from the following specifications taken with the accompanying drawings, in which:

Fig. 1 is a sectional view through a pressure regulator casing showing one form of the invention;

Fig. 2 is a fragmentary plan view showing the manner of clamping the complementary parts of the diaphragm housing together and with parts broken away showing the mounting of the operating lever;

Fig. 3 is an end view with the nipple removed showing the relation of valves to the valve block and the nature of certain spring means in this embodiment of the invention;

Figure 4:
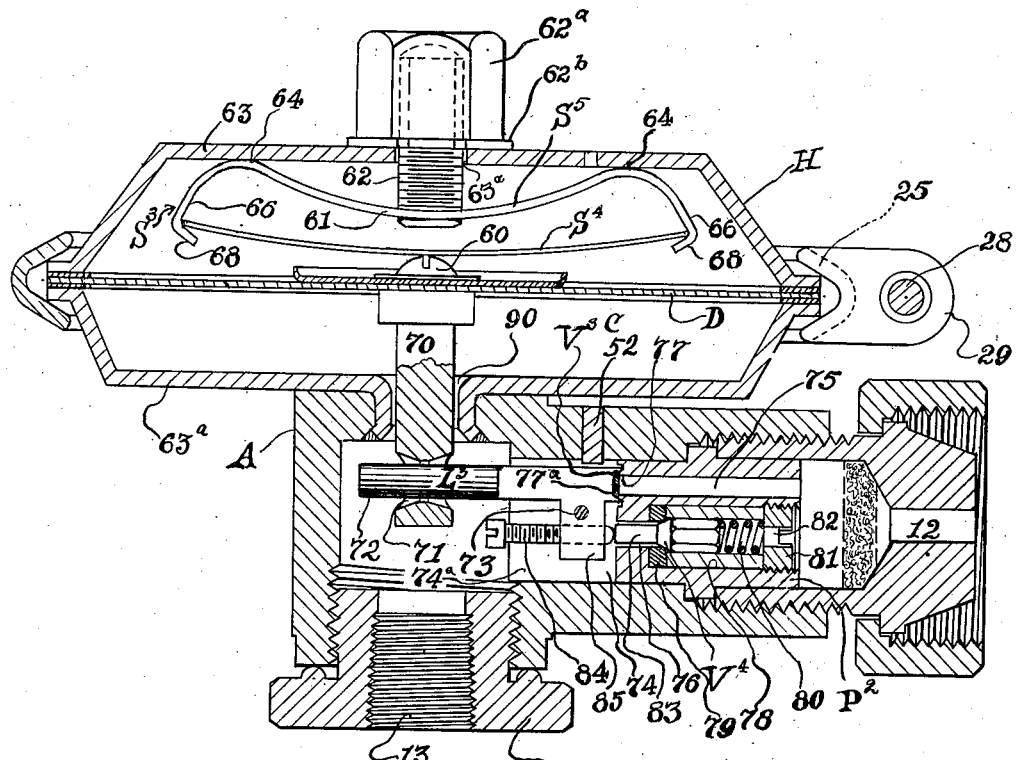
Fig. 4 is a sectional view similar to Fig. 1, of another form of the invention.

The apparatus as illustrated in Figs. 1, 2, and 3 of the drawings comprises in its main features a casing A having a bore or passage B therethrough divided into inlet and outlet portions by a partition P which may be in the nature of a valve block or plug located in the passage. The valve block P is provided with a pair of passages or ports 10 and 11 therethrough connecting the inlet and outlet portions of the passage B and these ports are under control of valves V' and V² operating simultaneously from opposite sides of the block under influence of variations in pressure in the passage B preferably on the outlet side of the valve block. These pressure variations are communicated to the valves through pressure-responsive means, as a diaphragm D, operatively connected with the valves by means of suitable linkage including a lever L pivotally mounted by a pin 30 in a chamber C constituting a part of the outlet portion of the passage B. The connection between the valves and the lever is such that the moments of force of head pressure on the valves about the pivotal axis 30 of the lever will be equal and opposite whereby the influence of such pressure on the operation of the valves under influence of the diaphragm D will be substantially eliminated. The lever is provided with a long arm between the connection thereof with the diaphragm and its pivot joint which serves, in addition to operation of the valves, in toggle relation with a resilient member, as a helical spring S², to compensate for such variations in force exerted on the diaphragm D by a regulator spring S' as are due to compression and expansion of the latter spring under changes of fluid pressure exerted thereon through the diaphragm D as it moves from and toward its normal central position. The compression of spring S' is adjustable through suitable means as will hereinafter appear for determining the responsiveness of the diaphragm to pressure changes in the chamber C.

The bore B of the casing is provided with inlet and outlet ports 12 and 13 between which, and preferably nearer to the inlet port than to the outlet port, the valve block P is located and this member is held in place against a shoulder 14 formed in the bore by suitable means as by the end of a nipple 15 in which is located the port 12 and which is threaded into the bore and serves for connecting the regulator with a source of gas supply.

The nipple may be chambered as shown at its left end to receive a portion of the valve block therein, thereby forming a closed chamber in which suitable filtering material 16 between screens 17a and 17b is held in place with the screens by a ring 17. The portion of the block P resting against the shoulder 14 is also in the nature of a shoulder 18 and its face opposite that resting against shoulder 14 is tapered so that, by screwing of nipple 15 into the bore B, a tight leak-proof connection between the nipple and plug is effected.

The valve block P is provided with cylindrical bores 19 and 20 coaxial respectively with the ports 10 and 11 extending from said ports to opposite ends of the block, and the block is also provided with a bore 21 extending in the same direction from port 11 as bore 19 and serving as a passage between port 11 and the chamber C on the outlet side of the block. The valves V' and V² are respectively slidably mounted in the cylindrical bores 19 and 20 and are arranged to operate in opposite directions to control their respective ports. The valves may be of any suitable variety as of the needle type having conical end portions and body portions of fluted or polygonal cross-section (as shown in Fig. 3 square) and of such dimensions as to contact at their corners with the walls of the bores in which they are located and to be guided thereby in their movements for controlling the ports. By such configuration of the valve bodies in relation to the cylindrical bores, the valves are prevented from chattering or sidewise movements; at the same time permitting free passage of fluid through the bores and insuring equal effective pressures on the valves from the inlet side thereof, assuming the valve ports are of equal area.

The diaphragm D is located in the chamber C' of a diaphragm housing H, which is connected with chamber C by a passage 22 and forms a part thereof. This housing is formed by uniting two dished circular plates 23 and 24 at their edges, as by a split clamping ring 25 having converging walls 26, 27, the ends of which may be drawn together by a screw bolt 28 threaded through ears 29 on the ends of the ring. The edges of the plates 23 and 24 are positioned to lie in parallelism and to clamp therebetween the edge of the diaphragm D which may be conveniently formed of thin metal as brass or any other suitably resiliently yielding metal.

Gaskets 23a, 24a of suitable material to effect a leak-proof connection at the edges of the plates may be provided between the respective plates and the diaphragm, the upper gasket being preferably of resilient brass and the lower gasket of fibre or other suitable compressible material.

The lever L is pivoted in a kerfed extension $P^2$ of the valve block P for angular movement by a pin 30 located adjacent one end of the lever; the long arm 31 of the lever being connected with the diaphragm D by means of a stem 32 secured to the diaphragm by a screw 33 and to the lever by a yoke 34 threaded onto the lower end of the stem and pivoted to the lever by a pin 35. Valves V' and $V^2$ are operatively connected with the lever by stems 36 and 37, one end of the former resting in a bore 38 formed in valve V' and the other end projected into a recess 39 in the lever but with no positive connection with either the lever or the valve. The stem 36 is comparatively thick and rigid and adjusts itself to movements of the lever L through the flexible connections at its ends with the valve and with the lever and, by this construction, is readily put in place in the assemblage. The stem 37, on the other hand, is rigidly connected with the valve $V^2$ and lever L by suitable means as by solder at 37a and 37b and is consequently made of thin resilient wire in order to provide flexibility between the valve $V^2$ and the lever L during their control movements.

The valves preferably operate in parallelism and, to this end, the adjacent end of the lever L is enlarged to provide, in effect, lateral extensions with which the valve stems connect. In practice, the valves are normally open to the extent to which they are set by means of the regulator spring S' as will hereinafter appear, the valve $V^2$ being held open by the control lever under influence of the diaphragm and spring S' and valve V' being held open by suitable yieldable means as spring 42 secured between valve block P and this valve.

The regulator spring S' is of the usual type, and is seated at its lower end against a plate 43 which is secured to the upper side of the diaphragm D by screw 33; the upper end of the spring being received in a cap 43 threaded to a neck 44 provided on the housing H for vertical adjustment in regulating the compression of spring S', and its pressure against the diaphragm D. The compensating spring $S^2$ is assembled in toggle relation with stem 32 and the long arm of lever L, by providing the latter with a pointed portion 45 projecting beyond pin 35 and by providing a set screw 45a threaded through the casing A in opposition to the pointed end of the lever and formed with a similarly pointed end. The spring $S^2$ is provided with buttons 46 and 47 at its opposite ends having conical depressions 48 and 49 in which the pointed ends of the lever arm and set screw are respectively seated; the depressions being of wider angle than the points resting therein, thus providing for free pivotal movement of the spring about both of these ends.

In the construction of the apparatus as set forth above, it will be noted that the chamber C and the housing for block P comprise a single bore and that the outlet port 13 is located in a plug 50 threaded into an opening 51 in the casing A opposite the passage 22; the opening 51 being of sufficient size to permit of ready access to the interior of the casing in assembling the spring $S^2$ and lever L with the diaphragm stem 32. The diaphragm housing H may be dismantled by loosening the screw bolt 28 and expanding the clamping ring 25. By this construction and arrangement of elements the apparatus may be readily assembled or dismantled as desired.

The above described apparatus operates as follows: With the compression of spring S' adjusted for maintaining the desired discharge pressure for the apparatus with the valves V' $V^2$ open sufficiently to pass the normally required amount of fluid upon an increase of pressure in chamber C above this normal, the diaphragm D will be forced upward moving the valves proportionally toward their seats and progressively closing the ports. In this upward movement, spring S' will be gradually compressed and will progressively oppose greater resistance to this movement in proportion to the increase in force exerted by the increase in pressure in the expansion chamber.

In the embodiment of the invention shown in Figs. 1–3, this tendency is overcome by the compensating spring $S^2$ which, in the normal operation of the apparatus, lies in a substantially neutral position at right angles to spring S', but as the diaphragm moves upwardly, is rotated about the end of set screw 45a in an upwardly direction, progressively adding its force to the pressure within chamber C in opposition to that of spring S'. The compression of spring $S^2$ may be adjusted through set screw 45a and its construction and arrangement may be such as to progressively increase the force thereof opposed to the force of spring S' in the proportion to the progressive increase in the force of spring S' and to thereby effectively counteract the increase in force of spring S' above the normal for which it has been adjusted, as it is compressed. With movements of the diaphragm in the opposite direction, of course, the force of both springs S' and $S^2$ will be progressively diminished proportionally to each other until normal conditions again prevail.

The influence of head pressure at material variance from the predetermined normal upon the proper opening and closing of the valves is effectively nullified by the positioning of valves V' and $V^2$ for simultaneous opening and closing in opposite directions under influence of pressure changes in chamber C and in the manner as set forth above. The pressure acting on the two valves is equal since the ports are of the same size and the arrangement of valve $V^2$ is such that the effective pressure thereon from the inlet side of the valve is proportional to the area of its port. With the present arrangement, also, the distances between the directions of movement of the two valves and the pivotal axis of lever L are equal and the ratio between the moments of force of the valves about the pivot pin 30 is unity.

Obviously, this ratio must be maintained regardless of whether the ports are of equal or unequal area on the well known principles of this physical phenomena and, with this ratio maintained, the force acting on each valve from the intake side thereof will neutralize that acting on the other valve so that the valves will open and close under the influence of pressure on the exhaust side thereof only, unopposed and unaided by pressure influence from the intake side.

In assembling the apparatus as shown in Figs. 1, 2 and 3, the valves V' and $V^2$ and lever L may be assembled with the valve block P before inserting the same in the bore B of the casing. In effecting such assemblage, valve V' may be first inserted in the bore 19 and the stem 36 placed in the bore of the valve so as to rest loosely therein. The lever may then be pivoted in the kerf of the block extension $P^2$ and the forward end of the stem 36 inserted in socket 39. The long arm of the lever may then be raised to its upper limit closing valve V' against its seat and held in this position while the stem 37 of valve $V^2$ is being soldered or otherwise permanently connected to the lever, the other end of the stem having been previously secured to the valve $V^2$, or, obviously, the stem may have been previously secured to the lever and the valve subsequently attached thereto. The block P may then be inserted in the bore with the shoulder thereof resting against shoulder 14 and a pin 52, provided for the purpose, resting in the kerf of the block extension $B^2$; the pin serving as a guide to properly align the block in the bore and at the same time to prevent relative rotation between the block and the casing.

After placing the block in the bore and securing it therein by means of the nipple 15, the lever L may be pivotally connected with stem 32 after which the diaphragm may be put in place, secured to the stem by screw 33 and plate 23 of the diaphragm housing put in place and clamped to plate 24 by means of the expandible clamping ring 25. Spring S' may then be inserted through neck 44 and cap 43 threaded in place, after which spring $S^2$ may be connected between the pointed ends of the lever L and set screw 45a and plug 50 threaded into the opening 51 whereupon the regulator is ready for use in a fluid conduit.

The apparatus as shown in Fig. 4 accomplishes the same end as that shown in Figs. 1, 2 and 3 by a mechanism differing materially in some respects therefrom but, in the main, based broadly on the same principles.

In this form of the invention, the equilibrium of forces upon the diaphragm is attained, in so far as the regulator spring for adjusting the responsiveness thereof to pressures in the casing is concerned, by providing a compound spring mechanism $S^3$ located in the diaphragm housing H on the upper side of the diaphragm D which is clamped between upper and lower members 63 and 63a which together form a diaphragm chamber. The compound spring $S^3$ is comprised of a regulator spring $S^5$ and a compensating spring $S^4$. The spring $S^4$ is in the nature of a light leaf spring bowed downwardly into contact, at an intermediate point, with the diaphragm screw 60 and its ends are connected with the regulator leaf spring $S^5$ which is also centrally bowed downward as at 61 and riveted at its center to the end of an adjusting screw 62 which extends through an opening 63a in the upper member 63 of diaphragm housing H and is threaded into a cap 62a which rests upon a washer 62b on the top of member 63. The spring $S^5$ is in contact with the top of the diaphragm housing H at the ends 64 of the bowl 61, and from these points is bent downward at an angle to provide end portions 66 which are turned in at its lower ends 68 to form seats for the ends of spring $S^4$. When so assembled, the points of contact at 64 of the compensating spring with the top of the housing H serve as fulcrums about which the ends 66 rotate in adjusting the pressure exerted by spring $S^5$ on the ends of spring $S^4$, and in the movements of these end portions compensatorily to changes in the pressure exerted by spring $S^4$ on the diaphragm. Spring $S^4$ is preferably formed so as to be normally bowed downward, but the bow may be provided by the pressure on its ends by the portions 66 of spring $S^5$ as desired.

The leaf spring $S^4$ forms, in effect, a toggle construction with the diaphragm stem 70 connected with the pressure-responsive diaphragm D by the diaphragm screw 60, the stem serving with lever $L^3$ hereinafter described to transmit the movement of diaphragm D to the valves. The regulator spring $S^5$ is preferably of heavier material than spring $S^4$ and the end portions 66 provide a comparatively stubborn resistance to the straightening movement of spring $S^4$ increasing as the latter approaches its straight line position and decreasing as the bow is accentuated. Resistance of these end portions, of course, may be varied by adjustment. Also as the spring $S^4$, when of the form having a normal downward bow and considered independently of the thrust exerted on its ends by spring $S^5$, moves toward straight line position, the component of its force acting on the diaphragm D increases; becoming maximum in its straight line position, while the effective component of the force of spring $S^5$ on the diaphragm at the same time decreases and becomes zero in the straight line position of spring $S^4$. Consequently with a proper selection of these two component springs, their forces will exactly supplement each other in all positions of springs $S^4$ within the range between its normal downward bowed position and the straight line position.

In the present apparatus the tendencies of the force of the compensator spring $S^4$ to increase as it approaches straight line position and of the counteracting component of force of the downturned ends of the compensating spring to decrease under the same circumstances are taken advantage of to provide a balanced spring construction in which the force exerted on a diaphragm is maintained substantially constant throughout its range of movements under pressure of fluid in the casing. Through the adjusting screw 62, the responsiveness of the diaphragm to pressure in the passage B may be adjusted at will.

The diaphragm stem 70 is provided at its lower end with an opening 71 in which the long arm 72 of the lever $L^3$ may be slidably received. This opening flares outwardly at both ends and provides a central constriction providing, in effect, a knife edge on which the arm of the lever may rock. The lever is pivoted by a pin 73 in the kerf 74a between parallel extensions 74 on a valve block $P^2$ similar to those in block P in in Figs. 1, 2 and 3 providing ports connecting the inlet and outlet sides of the bore B. These ports are under control of valves $V^3$, $V^4$ which are operated in their control movements by the diaphragm D through lever L and stem 70 as stated above.

The valve $V^3$ is formed as a part of lever L and is cup-shaped to receive therein a nozzle 77 formed on the valve block at the end of passage 75. There may be provided in the bottom of this cup-shaped valve a thin layer of solder 77a serving to provide a leak-proof connection when the valve is seated against the end of nozzle 77. Valve $V^4$ operates oppositely to valve $V^3$ and is in the nature of a needle valve having a pointed end and a body of polygonal cross-section which is housed in a counterbore 78 coaxial with passage 76. The valve $V^4$ is pressed against its seat 79 by a helical spring 80 held against its rear end by a plug 81 threaded into the counterbore and apertured at 82 to permit passage of fluid therethrough. The forward end of the valve V⁴ is provided with a stem 83 extending through passage 76 and is operated by pressure exerted on the end of the stem by a set screw 84 threaded through a lateral arm 85 on the lever L. The operation of the apparatus shown in Fig. 4 is substantially the same as that illustrated in Figs. 1, 2 and 3.

Figure 5:
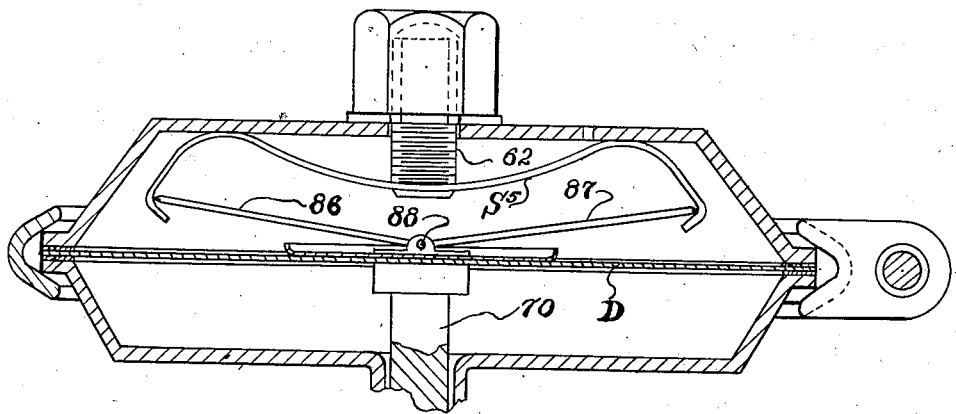
Fig. 5 is a fragmentary sectional view similar to Fig. 4 and showing a modification of the regulator mechanism thereof.

The regulator mechanism illustrated in Fig. 5 of the drawings differs from that shown in Fig. 4 only in the substitution for spring S⁴, of a pair of levers 86 and 87 pivoted at 88 to the stem 70 and in toggle relation therewith. The reaction of this form of the mechanism to pressure changes is similar to that of the mechanism shown in Fig. 4 except that the levers 86 and 87 do not of themselves supply a vertical pressure component upon the diaphragm.

I claim:

1. The combination of a casing having a fluid passage therethrough; pressure-responsive means movable under influence of pressure changes in the passage; valve means controlling the flow of fluid through said passage under influence of the movements of the pressure-responsive means; and regulator means for controlling the responsiveness of the pressure-responsive means comprising a pair of leaf springs, one of said springs being bowed and in contact with the pressure responsive means intermediately of the ends of its bowed portion and the other of said springs being centrally bowed in the same direction as the first and having portions in opposition to end thrust of the first of said springs; said springs being arranged to exert a resultant force on the pressure-responsive means substantially constant regardless of variations in position of the pressure-responsive means from its normal position.

2. The combination of a casing having a fluid passage therethrough; pressure-responsive means movable under influence of pressure changes in the passage and valve means controlling the flow of fluid through said passage under influence of the movements of the pressure-responsive means; regulator means for controlling the responsiveness of the pressure-responsive means comprising a pair of leaf springs connected at their ends, one of which is bowed to contact intermediately of its ends with the pressure-responsive means and in toggle relation with its direction of movement, the other being intermediately bowed and bent oppositely to the intermediate bow adjacent its ends and fulcrumed at the bends so as to provide a thrust on the ends of the first spring compensatory to changes in force of the first spring on the pressure-responsive means due to movements of the pressure-responsive means.

3. Apparatus comprising the combination of a movable member, means including a resilient member for exerting a force on said movable member, the force exerted by said resilient member on said movable member varying with changes in position of the latter, and means cooperating with said resilient member operative to compensate for variations in force exerted by the latter to maintain the resultant force exerted on said movable member by said resilient member and said compensating means substantially constant in any position of said movable member.

4. Apparatus comprising the combination of a movable member, means including a resilient member for exerting a force continuously on said movable member, the force exerted by said resilient member on said movable member varying with changes in position of the latter, and means including a second resilient member cooperating with said first-mentioned resilient member and operative to compensate for variations in force exerted by said first-mentioned resilient member to maintain the resultant force exerted by both of said resilient members on said movable member substantially constant in any position of said movable member.

5. Apparatus comprising the combination of a movable member, means including a spring for normally exerting a force continuously on said movable member, the force exerted by said resilient member on said movable member varying with changes in position of the latter, a second spring cooperating with said first-mentioned spring, said second-mentioned spring having a neutral position and always being movable from such position proportionately to changes in position of said movable member, said second-mentioned spring being operative at all times, other than when in a neutral position, to exert a force on said movable member to compensate for variations in force exerted by said first-mentioned spring.

6. Apparatus comprising the combination of a movable member, means including a helical spring disposed in a plane substantially normal to said movable member for exerting a force on the latter, the force exerted by said helical spring on said movable member varying with changes in position of the latter, linkage mechanism comprising a stem disposed in a plane normal to said movable member and connected thereto and an element disposed substantially parallel to said movable member and pivotally connected to said stem, a second spring disposed substantially parallel to said movable member and pivotally connected to said stem adjacent the point said element is connected thereto, said element and said second-mentioned spring forming a toggle joint with said spring having only a component of force toward said element when said second-mentioned spring and said element are in alignment, said second-mentioned spring having a component of force, when out of alignment with said element, operative to compensate for variations in force exerted by said first-mentioned spring to maintain the resultant force exerted by both of said springs on said movable member substantially constant in any position of said movable member.

7. Apparatus comprising the combination of a movable member, and means including a main bowed leaf spring and a cooperating compensating bowed leaf spring arranged to exert a force on said movable member, said main spring having the outer ends thereof bent to receive the ends of said compensating spring, the degree of bow of said compensating spring determining the amount of end thrust of the bent portions of said main spring on said compensating spring and also the component of such end thrust effective to act upon said movable member, variations in force exerted by said main spring on said movable member with changes in position of the latter being supplemented by variations in force exerted by said compensating spring to maintain the resultant force exerted by both of said springs on said movable member substantially constant in any position of said movable member.

8. Apparatus comprising the combination of a casing having a fluid passage provided with an inlet and an outlet, valve means in said passage for regulating the flow of fluid therethrough, and means for maintaining the pressure of the fluid in said passage substantially constant irrespective of the quantity of fluid discharged at the outlet, said last-mentioned means including a movable member responsive to the pressure of the fluid in said passage for controlling said valve means, means including a resilient member for exerting a force on said movable member opposing the pressure of said fluid, the force exerted by said resilient member on said movable member varying with changes in position of the latter, and means cooperating with said resilient member operative to compensate for variations in force exerted by the latter to maintain the resultant force exerted on said movable member by said resilient member and said compensating means substantially constant in any position of said movable member.

9. Pressure regulating apparatus comprising the combination of a casing having a fluid passage provided with an inlet and an outlet, valve means in said passage for regulating the flow of fluid therethrough, and means for maintaining the pressure of the fluid discharged at the outlet substantially constant irrespective of the demand of fluid, said last-mentioned means including a movable member responsive to changes in pressure of the fluid in said passage for controlling said valve means, means including a resilient member for continuously exerting a force on said movable member opposing the pressure of said fluid, the force exerted by said resilient member on said movable member varying with changes in position of the latter, and means including a second resilient member cooperating with said first-mentioned resilient member and operative to compensate for variations in force exerted by said first-mentioned resilient member to maintain the resultant force exerted by both of said resilient members on said movable member substantially constant in any position of said movable member.

10. Pressure regulating apparatus comprising the combination of a casing having a fluid passage provided with an inlet and an outlet, valve means in said passage for regulating the flow of fluid therethrough, and means for maintaining the pressure of the fluid in said passage substantially constant irrespective of the quantity of fluid discharged at the outlet, said last-mentioned means including a movable diaphragm responsive to changes of pressure of the fluid in said passage for controlling said valve means, means including a spring for continuously exerting a force on said diaphragm, the force exerted by said spring on said diaphragm varying with changes in position of the latter, a second spring cooperating with said first-mentioned spring, said second-mentioned spring having a neutral position and always being movable from such position proportionately to changes in position of said diaphragm, said second-mentioned spring being operative at all times, other than when in a neutral position, to exert a force on said diaphragm to compensate for variations in force exerted by said first-mentioned spring.

11. Apparatus comprising the combination of a movable member, means including a main bowed leaf spring for exerting a force on said movable member, the force exerted by said main bowed spring on said movable member varying with changes in position of the latter, and means including a second bowed leaf spring cooperating with said main bowed spring operative to compensate for variations in force exerted by the latter to maintain the resultant force exerted on said movable member by said main bowed spring and said compensating bowed spring substantially constant in any position of said movable member.

12. Apparatus comprising the combination of a movable member, means including a bowed leaf spring for exerting a force on said movable member, the force exerted by said bowed spring on said movable member varying with changes in position of the latter, and means cooperating with said bowed spring operative to compensate for variations in force exerted by the latter to maintain the resultant force exerted on said movable member by said bowed spring and said compensating means substantially constant in any position of said movable member, said compensating means including a pair of arms each having one end thereof connected to an end of said bowed spring and the opposite ends thereof pivotally connected to each other, and means for connecting said pivotal connection to said movable member.

13. Apparatus comprising the combination of a movable member, and means including a bowed leaf spring and a cooperating compensating pair of pivotally connected arms arranged to exert a force on said movable member, said bowed leaf spring having the outer ends thereof bent to receive the free ends of said compensating arms, the angularity of said compensating arms determining the amount of end thrust of the bent portions of said bowed leaf spring on said compensating arms and also the component of such end thrust effective to act on said movable member, variations in force exerted by said bowed leaf spring on said movable member with changes in position of the latter being supplemented by variations in force exerted by said compensating arms to maintain the resultant force exerted by said bowed leaf spring and said compensating arms substantially constant in any position of said movable member.

14. Pressure regulating apparatus comprising the combination of a casing having a fluid passage provided with an inlet and an outlet, valve means in said passage for regulating the flow of fluid therethrough, and means for maintaining the pressure of the fluid in said passage substantially constant irrespective of the quantity of fluid discharged at the outlet, said last-mentioned means including a movable member responsive to changes in pressure of the fluid in said passage for controlling said valve means, means including a main bowed leaf spring for exerting a force on said movable member, the force exerted by said main bowed spring on said movable member varying with changes in position of the latter, and means including a second bowed leaf spring cooperating with said main bowed spring operative to compensate for variations in force exerted by the latter to maintain the resultant force exerted on said movable member by said main bowed spring and said compensating bowed spring substantially constant in any position of said movable member.

15. Pressure regulating apparatus comprising the combination of a casing having a fluid passage provided with an inlet and an outlet, valve means in said passage for regulating the flow of fluid therethrough, and means for maintaining the pressure of the fluid in said passage substantially constant irrespective of the quantity of fluid discharged at the outlet, said last-mentioned means including a movable member responsive to the pressure of the fluid in said passage for controlling said valve means, means including a bowed leaf spring for exerting a force on said movable member, the force exerted by said bowed spring on said movable member varying with changes in position of the latter, and means cooperating with said bowed spring operative to compensate for variations in force exerted by the latter to maintain the resultant force exerted on said movable member by said bowed spring and said compensating means substantially constant in any position of said movable member, said compensating means including a pair of arms each having one end thereof connected to an end of said bowed spring and the opposite ends thereof pivotally connected to each other, and means for connecting said pivotal connection to said movable member.

WILLIAM F. MESINGER.